United States Patent
Spohn

(12)
(10) Patent No.: US 6,482,482 B1
(45) Date of Patent: Nov. 19, 2002

(54) HYDROCARBON FLUID CONTAINMENT FOR MOTORIZED TRANSPORTATION VEHICLES

(75) Inventor: Peter Dwight Spohn, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/106,704

(22) Filed: Jun. 29, 1998

Related U.S. Application Data

(60) Provisional application No. 60/053,750, filed on Jul. 25, 1997.

(51) Int. Cl.[7] .......................... B32B 27/28; B32B 27/34; B32B 27/36; B32B 27/40
(52) U.S. Cl. ..................... 428/35.7; 138/137; 428/36.9; 428/36.91; 428/420; 428/421; 428/474.1; 525/64; 525/66; 525/68; 525/72; 525/902
(58) Field of Search ........................... 138/137; 428/421, 428/420, 474.4, 36.9, 36.91, 35.7; 525/72

(56) References Cited

U.S. PATENT DOCUMENTS

| 4,804,703 A | * | 2/1989 | Subramanian | ............... 524/444 |
| 5,500,257 A | | 3/1996 | Krause et al. | ............... 427/487 |
| 5,576,106 A | | 11/1996 | Kerbow et al. | ............. 428/403 |
| 5,590,691 A | * | 1/1997 | Iorio et al. | ................... 138/146 |
| 5,891,373 A | * | 4/1999 | Hunter | ........................ 264/104 |

FOREIGN PATENT DOCUMENTS

| EP | 0 523 644 A1 | | 7/1992 | ........... B32B/27/08 |
| EP | 0523644 A1 | * | 1/1993 | |
| EP | 0761757 A1 | * | 3/1997 | ........... C08L/51/00 |
| WO | WO 9416016 A | * | 7/1994 | |
| WO | 9629200 A | * | 9/1996 | |

* cited by examiner

*Primary Examiner*—Sandra M. Nolan

(57) ABSTRACT

Structures for transport and containment of hydrocarbon fluids for motorized transportation vehicles are made from a blend of polar-grafted fluoropolymer dispersed in a matrix of polar polymer. The blend can be in a component element of a composite structure.

13 Claims, No Drawings

HYDROCARBON FLUID CONTAINMENT FOR MOTORIZED TRANSPORTATION VEHICLES

RELATED APPLICATION

This application claims the benefit of Provisional Application No. 60/053,750 filed Jul. 25, 1997.

FIELD OF THE INVENTION

This invention relates to vessels and transport lines for containing hydrocarbon fluids.

BACKGROUND OF THE INVENTION

Motorized transportation vehicles, e.g. automobiles, trucks, and airplanes, all have transportation lines and vessels for containing the on-board hydrocarbon fluids during transportation and treatment of the fluids, respectively. The fluids can be liquid or vapor or mixture thereof, and the task of containment includes preventing permeation of the fluid through the structure defining the transportation lines and vessels. The transportation lines are generally tubular structures and include such lines as fuel line hose, fuel filler hose, sometimes called jumper hose, fuel vapor lines, lines for returning fuel combustion products to combustion, lines for transporting alcohol containing liquid between washer fluid reservoir and washer spray nozzles, and antifreeze lines. Vessels used on board the vehicle for treatment of the fluid are generally cylindrical structures, with one end closed and with an inlet for the untreated fluid and an outlet for treated fluid, such as carbon canisters for scrubbing fuel vapor from inlet fluid, and oil and fuel filters.

Current materials of construction are primarily of metal, but metal has the disadvantage of being corroded by the conditions of use of the vehicle or of excessive cost when non-corrosive metals or metal systems are used which resist corrosion and of adding weight to the vehicle. Polyamide has been used in some fuel line hose applications, but polyamide suffers from excessive hydrocarbon vapor permeability. Fluoropolymers have high vapor impermeability. U.S. Pat. No. 5,500,257 discloses composite fuel line in which the inner layer is made of fluoropolymer and the outer layer is made of polyamide, to provide the impermeability and strength, respectively, to the composite fuel line. The fluoropolymer inner layer is extruded first, followed by surface treatment of the outer surface of the fluoropolymer tubular extrudate and extrusion of the polyamide outer outer later onto the surface treated inner layer.

SUMMARY OF THE INVENTION

The present invention combines the strength of polar polymers such as polyamide and polyester and impermeability of fluoropolymer into a single layer as material of construction for lines and vessels for on-board transport and treatment of hydrocarbon fluid, and for handling such fluid in related functions such as servicing and delivery. Thus, the present invention can be described as vessels and transport lines for containment of hydrocarbon fluids for motorized transportation vehicles, the structure of said vessels and transport lines comprising a blend of polar-grafted fluoropolymer dispersed in polar polymer which is incompatible with said fluoropolymer prior to polar grafting of said fluoropolymer, said polar polymer providing strength to said structure and said polar-grafted fluoropolymer dispersed therein providing improved impermeability of said structure to said hydrocarbon fluids, whereby said vessels and transport lines are able to contain said hydrocarbon fluids.

The transport lines and vessels include those lines and vessels described above and can have similar construction, e.g., tubular in the case of transport lines and cylindrical housings (canisters) in the case of vessels. Thus, the present invention includes such specific on-board fluid handling products as fuel line hose, fuel filler hose, vapor return hose, carbon canisters, and oil filter housings.

The aforesaid blend will typically contain 3 to 43 vol % of the dispersed fluoropolymer and can be used as the sole material of construction of the structure defining the line or hose, depending on the particular hydrocarbon fluid being handled to provide improved impermeability. Alternatively, the blend may form a layer of a multilayer structure defining the line or vessel. For example, such structure can comprise an inner layer of fluoropolymer and the blend forms an outer layer, with the dispersed polar-grafted fluoropolymer in the blend layer causing the two layers to adhere together without any surface treatment of the inner layer. Thus, such composite structure can be made by simultaneous formation of both layers, i.e., by coextrusion whereby the molten layers adhere to one another as they come together outside of the extrusion die. Such composite structure can be coextruded in the form of tubing or other shape that can be converted to the desired fluid handling articles, such as coextruded sheet which can be thermoformed into vessel shapes. Another alternative is to have the blend layer coextruded as an interlayer between simultaneously extruded inner and outer layers of fluoropolymer and polar polymer, respectively, with the blend layer thereby serving to adhere the inner and outer layers together.

DETAILED DESCRIPTION

A melt-mixed blend having a continuous phase (matrix) and a dispersed phase is the basic material of construction of the hydrocarbon fluid handling articles of the present invention. The continuous phase of the blend is a polar polymer that is not a fluoropolymer, while the dispersed phase is a polar-grafted fluoropolymer. The hydrocarbon fluid includes compounds that are hydrocarbon-based or hydrocarbon derivatives, e.g., hydrocarbon compounds containing heteroatoms. The fluid can contain some non-hydrocarbon components such as additives, but it is still primarily a hydroocarbon fluid. As conventional and as used herein, "fluid" encompasses liquid and gas.

The base fluoropolymer of the fluoropolymer component of the blend layer is by itself incompatible with the polar polymer matrix, i.e., when the two polymers are melt blended together such as in a twin-screw extruder, the resultant fluoropolymer dispersed phase is composed of rather large particles (domains), e.g. at least 2000 nm in average particle size, by virtue of the fluoropolymer preferring to associate with itself rather than the polar polymer during the blending process. Dispersed particle size is determined by transmission electron microscopy. Examples of fluoropolymers include a wide variety of fluoropolymers which are melt extrudable, such as indicated by a melt viscosity in the range of $0.5 \times 10^3$ to $60 \times 10^3$ Pa·s as normally measured for the particular fluoropolymer. The fluoropolymer is made from at least one fluorine-containing monomer, but may incorporate monomer which contains no fluorine or other halogen. Preferably at least one monomer contains hydrogen and in that regard the hydrogen/fluorine atomic ratio is preferably at least 0.1:1. The fluoropolymer, however, preferably contains at least 35 wt % fluorine. Fluorinated monomers include those which are fluoroolefins containing 2 to 8 carbon atoms and fluorinated vinyl ether (FVE) of the formula $CY_2=CYOR$ or $CY_2=CYOR'OR$ wherein Y is H or F and —R— and —R'— are independently completely fluorinated or partially fluorinated linear or branched alkyl and alkylene groups containing 1 to 8 carbon atoms. Preferred R groups contain 1 to 4 carbon atoms and are preferably perfluorinated. Preferred R' groups contain 2 to 4 carbon atoms and are preferably perfluorinated. Hydrocarbon monomers that can be used include ethylene, propylene, n-butylene, and iso-butylene. Preferred fluoropolymers are the copolymers of ethylene with perhalogenated monomers such as tetrafluoroethylene (TFE) or chlorotrifluoroethylene (CTFE), such copolymers being often referred to as ETFE and ECTFE, respectively. In the case of ETFE, minor amounts of additional monomer are commonly used to improve properties such as reduced high temperature brittleness. Perfluoro(propyl vinyl ether) (PPVE), perfluoro(ethyl vinyl ether) (PEVE), perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly hexafluoropropylene (HFP) and optionally TFE. TFE/HFP copolymer which contains a small amount of $VF_2$, which copolymer is often referred to as THV, can also be used. Examples of perfluorinated copolymers include TFE with HFP and/or PPVE or perfluoro(ethyl vinyl ether). Such fluoropolymers are usually partially-crystalline as indicated by a non-zero heat of fusion associated with a melting endotherm as measured by DSC on first melting, and are considered to be fluoroplastics rather than fluoroelastomers.

Prior to melt blending with the polar polymer, the fluoropolymer is subjected to a grafting process which attaches polar-functional groups onto the fluoropolymer. This converts a normally inert (non-adherent) fluoropolymer which does not adhere to dissimilar materials, even polar polymers, to a polar-grafted fluoropolymer which has adhesive quality and does adhere to (interact with) polar polymer. This adhesion manifests itself in the melt blending process as the polar-grafted fluoropolymer being reduced to much smaller particle sizes dispersed uniformly in the polar polymer matrix. Thus, the melt blending process can be carried out to produce dispersed particle sizes (average) of less than 1000 nm and preferably no more than 500 nm. The particles of polar-grafted fluoropolymer are generally spherical in shape, e.g., predominantly having a ratio of major/minor dimensions of 2/1 or less, and are generally well-dispersed (uniformly dispersed) in the matrix.

The fluoropolymer is functionalized by having an ethylenically unsaturated compound grafted thereto which imparts polar functionality to the fluoropolymer, the polar functionality being present as part of the ethylenically unsaturated compound, such as described for the grafted fluoropolymer powder in U.S. Pat. No. 5,576,106 and the grafted fluoropolymer described in EP 0 650 987. Other known methods of grafting can be used. Preferred polar-grafted fluoropolymers include the surface-grafted powder of the '106 patent. Examples of polar functionality provided by grafting include acids, including carboxylic, sulfonic and phosphonic acids, and esters and salts thereof, and epoxides. Glycidyl methacrylate is an example of a grafting compound that provides epoxide functionality. Among compounds for grafting onto and thereby becoming part of the polar-grafted fluoropolymer, maleic acid and maleic anhydride are preferred. Maleic anhydride can be halogen-substituted, e.g., dichloro-maleic anhydride and difluoro-maleic anhydride. The amount of grafting compound grafted to the fluoropolymer will be in an amount that is effective to cause development, in melt mixing of the blend, of the small dispersed particle size of the polar-grafted fluoropolymer as stated above. Generally, the amount of grafted compound is in the range of 0.1 wt % to 5 wt % based on the total weight of the resultant polar-grafted fluoropolymer. Preferably, the amount of grafted polar-functional compound is 0.2–3 wt %, more preferably 0.2–2 wt %.

The polar polymer forming the matrix of the blend is, of course, different from the polar-grafted fluoropolymer in that the polar polymer is free of fluorine. As used herein, "polar polymer" designates a polymer having polar groups, for example, carbonyl, amine or acid, present along the polymer chain and/or at the ends of polymer chains. Polar groups along the chain can be directly connected to the polymer backbone or can be in pendant groups attached to the backbone. Examples of such polymers include polyamide, polyester, and polyurethane resins.

Polyamide resins that can be used should of course be melt extrudable, and preferably have a number average molecular weight of at least 5000. Examples of polyamides include those made by condensation of equimolar amounts of at least one saturated carboxylic acid containing 4 to 14 carbon atoms with at least one diamine containing 4 to 14 carbon atoms. Excess diamine, however can be used to provide an excess of amine end groups over carboxyl end groups in the polyamide. Specific examples include polyhexamethylene adipamide (66 nylon), polyhexamethylene azelaamide (69 nylon), polyhexamethylene sebacamide (610 nylon), polyhexamethylene dodecanoamide (612 nylon) and polycaprolactam (6 nylon). Aromatic polyamides that are melt extrudable (e.g., aliphatic-aromatic polyamides, as opposed to polyaramids) can also be used in the melt-mixed blends of the present invention. Examples of such semiaromatic polyamides include Amodel® A 1000 and copolymers of 2-methylpentamethylenediamineterephthalate and hexaethyleneterephthalamide such as Zytel® HTN 501 (DuPont). Elastomer-modified versions of such aliphatic and aromatic polyamides can also be used, e.g., Amodel® ET 1000 HSNT (Amoco). Such polyamides are described in Kirk-Othmer, Encyclopedia of Chemical Technology, 4th ed., Vol. 19, p. 454 (1996).

Polyester resins that can be used in the invention are thermoplastic polyesters. Such polyesters are described in Kirk-Othmer, Encyclopedia of Chemical Technology, 4th ed., Vol. 19, p. 609 (1996). Thermoplastic polyesters include a wide range of compositions, including poly(ethylene terephthalate), poly(butylene terephthalate), poly (cyclohexanedimethylene terephthalate), poly (cyclohexyldimethylene terephthalate), and poly(ethylene naphthalene-2,6-dicarboxylate). Also included among thermoplastic polyesters are polymers that are thermoplastic elastomers, such as poly(ester-ether) block copolymers, and liquid crystal (all-aromatic) polyesters. Thermoplastic polyesters used in the present invention have sufficiently high molecular weight to be formed into self-supporting flexible films, and preferably have a number average molecular weight of at least 10,000. Preferred thermoplastic polyesters include poly(ethylene terephthalate), poly(butylene terephthalate), and thermoplastic polyesters that are thermoplastic elastomers.

Polyurethane resins that can be used in the invention are thermoplastic polyurethanes, including thermoplastic polyurethane elastomers and engineering thermoplastics. Such polyurethanes are described in Kirk-Othmer, Encyclopedia of Chemical Technology, 4th ed., Vol. 24, p. 695 (1997).

Thermoplastic polyurethanes include a wide range of compositions based on combinations of diisocyanates such as toluene diisocyanate, 4,4'-diphenylmethane diisocyanate and hexamethylene diisocyanate, polyols such as polyesters, polyethers, poly(propylene glycol) and poly(tetramethylene glycol), and chain extenders such as 1,4-butanediol. Commercial examples of thermoplastic polyurethanes include those sold under the trademarks Pellethane® (Dow Chemical), Estane® (Goodrich), Elastuf® (Goodyear), Texin® (Bayer), and Roylar® (Uniroyal).

The melt-mixed blend used in the present invention is preferably prepared by melt blending the ingredients together under high shear. The ingredients can first be combined in desired proportions and blended with each other in the dry state, such as by tumbling in a drum, or can be combined by simultaneous or separate metering of the feed of one or more of the components to the melt blending device. Preferably, the melt blending is done in a twin screw extruder, such as manufactured by Werner & Pfleiderer or by Berstorff. Numerous other high shear melt blending devices, as known to those skilled in the art, can be used without departing from the spirit of the invention.

For blends used in the present invention, the polar-grafted fluoropolymer used in the blend can impart fluoropolymer characteristics, previously lacking in the matrix polar polymer, to the blend without destroying the capability of the blend to adhere to neat polar polymer. Such characteristics can include a reduction in permeation by fuels (improved impermeability), better resistance to chemical attack, altered surface properties, and the like. Thus, the blends are suitable for use in the articles of the present invention. When the melt-mixed blend is to be used in combination with fluoropolymer in an article of the invention, as in a laminate, the amount of polar-grafted fluoropolymer in the blend is preferably any amount that is effective to cause the blend to adhere to a fluoropolymer layer. Such amount will vary with the identity of the fluoropolymer of the fluoropolymer layer and the amount of polar functional compound grafted to the fluoropolymer component of the blend.

The melt-mixed blend of the present invention can adhere to a coextruded layer of another polymer which may be fluoropolymer or polar polymer. As will be recognized by one skilled in the art, such adhesion can depend on laminating conditions as well as on compositions of the layers. Such conditions can include temperature, extrusion speed, draw down ratio, draw ratio balance, interfacial pressure, cooling rate, cooling conditions (such as maintenance of pressure during cooling), and the like, and can be influenced by equipment choices such as mandrel length, die design features including land length, and the like. By "adhere to a coextruded layer of another polymer" is meant that, when a laminate comprising another polymer and melt-mixed blend layers is formed in a single extrusion step, i.e., by coextrusion, the melt-mixed blend layer and the other layer adhere to one another without the presence of an adhesive tie layer. The adhesion can be characterized, for example, when the coextrusion is in the form of tubing and the melt-mixed blend forms one of the layers. When the tubing is longitudinally cut in half, the cut composite tubing half can be flexed and even bent at a 90° angle without the melt-mixed blend layer delaminating from the other layer.

The amount of polar-grafted fluoropolymer in the blend is generally 3–43 vol %, preferably 6–29 vol %, most preferably 10–21 vol %, based on combined weight of polar polymer and polar-grafted fluoropolymer. For a melt-mixed blend having a dispersed polar-grafted fluoropolymer that is a grafted copolymer of ethylene, tetrafluoroethylene, and perfluorobutyl ethylene as described in the examples below and a polar polymer matrix that is polyester, the aforesaid concentrations in vol% correspond to 4–50 wt %, 8–35 wt %, and 13–26 wt %, respectively, calculated using 1.70 g/cm$^3$ and 1.30 g/cm$^3$ as densities of the fluoropolymer and the polyester, respectively. For functionalized perfluoropolymer, concentrations by weight corresponding to the aforesaid volume concentrations would be higher according to the higher density of perfluorinated resins, typically about 2.15 g/cm$^3$.

The small dispersed particle size of the polar-grafted fluoropolymer results in the melt-mixed blend having good mechanical properties and surprisingly low permeability to chemicals such as hydrocarbon and hydrocarbon-based fuels having high vapor pressure. These properties make the blend suitable for use as a barrier to such chemicals in articles for transport and containment of such chemicals, i.e., articles of the present invention. Since the blend also adheres to fluoropolymer, such articles can be composites having good integrity with fluoropolymer adhered to the melt-mixed blend, e.g., multilayer structures.

When the melt-mixed blend is used as a component of, e.g., a layer of, a composite structure instead of as a monolithic structure defining the fluid handling article, the fluoropolymer of a separate fluoropolymer layer has the same general composition as the fluoropolymer that is polar-grafted, or is compatible (miscible) with the fluoropolymer that is polar-grafted. For best adhesion between layers, the fluoropolymer should be the same. When the matrix polar polymer forms a separate layer of the composite structure, the polar polymer forming the separate layer can be the same as the matrix polymer of the blend layer to promote adhesion between these layers. In these composite structures, the dispersed polar-grafted fluoropolymer in the blend layer is the adhesive for adhering the blend layer to the fluoropolymer layer; no separate adhesive layer is necessary. The matrix polymer of the blend layer will adhere to the same polymer forming a separate layer, if present.

The transport lines and vessels of the invention that are composite structures can be fabricated from the melt-mixed blend and the polar polymer by conventional coextrusion processes, followed up by thermoforming if a shape other than the extruded shape is desired, or by thermoforming a prefabricated shape such as a flat laminate. When the blend is to be used in a monolithic structure defining the line or vessel, melt fabrication processes such as extrusion and injection molding, including blow molding, can be used.

EXAMPLES

The polar-grafted fluoropolymer of the examples below is prepared generally according to Example 1 of U.S. Pat. No. 5,576,106. The fluoropolymer resin is an ETFE copolymer modified with PFBE, having an E/TFE molar ratio of about 0.9, containing 1 mol % PFBE, and having a melt flow rate (MFR) of about 7 g/10 min as measured according to ASTM D-3159 at 297° C. The copolymer is used as a finely divided powder having average particle size of about 100–120 μm (within the preferred range of 50–500 μm), as described in the '106 patent. Copolymer powder and maleic anhydride are blended in a powder/anhydride ratio of 100/1 and subjected to 6 Mrad of electron irradiation in a closed container to obtain surface-grafted powder. The resultant concentration of grafted maleic anhydride is about 0.4 wt %, as determined by the method disclosed in U.S. Pat. No. 5,576,106. The grafted ETFE powder is compacted at ambient temperature into pellets to facilitate feeding to an extruder. This polar-grafted fluoropolymer is identified as "g-ETFE".

Unless otherwise specified, the polyamide used is a 6,6-polyamide (Zytel® nylon resin grade 101, DuPont), hereinafter "nylon".

Unless otherwise specified, the thermoplastic polyester used is a poly(ethylene terephthalate) resin, (Crystar® polyester terephthalate resin grade 5054, DuPont), hereinafter "PET".

A thermoplastic polyester resin that is a thermoplastic elastomer (Hytrel® polyester elastomer grade 8238, DuPont) is also used, hereinafter "TPE".

Proportions of g-ETFE and nylon, or of g-ETFE and PET, in the following are based on combined weight or on combined volume of g-ETFE and the matrix resin.

Example 1

Blend 1 is 20 wt % (13.3 vol %) g-ETFE dispersed in a nylon matrix. The melt blending device is a 40-mm Werner & Pfleiderer twin screw extruder equipped with high-shear two-zone mixing screws operating at 400 rpm. The g-ETFE (40 lb/hr, 18.2 kg/hr) and nylon (160 lb/hr, 72.7 kg/hr) are fed into barrel section 1 by separate K-Tron loss-in-weight screw feeders. A vacuum is applied at barrel section 8. External barrel temperatures are 273–285° C., and product melt temperature is 389° C. as determined using a hand-held thermocouple temperature probe. After exiting through a 4-hole die, the strands are quenched in an ambient temperature water trough with circulating water. The strands are subsequently pelletized and allowed to cool under nitrogen sparge. A film hot-pressed from the Blend 1 pellets is treated with phospho-tungstic acid that stains only the nylon, and transmission electron micrographs (TEM) are recorded. The blend shows good mixing, with predominantly spherical g-ETFE particles having average diameter of about 200 nm evident on the surface and well dispersed in the nylon.

When ETFE that is not polar-grafted is used to make an ETFE/nylon blend that is 20 wt % ETFE, a stained film sample shows large spheres of ETFE about 5000–10,000 nm (5–10 $\mu$m) in diameter.

Example 2

Blend 2 is 50 wt % (38.0 vol %) g-ETFE dispersed in a nylon matrix. Blend 2 is prepared essentially by the procedure of Example 1, except that the feed rates of the g-ETFE and the nylon are each 100 lb/hr (45.5 kg/hr), the external barrel temperature is 264°–280° C., and the product melt temperature is 340° C. TEM for a stained film sample again shows good mixing, with spherical g-ETFE particles having average diameter of about 200 nm well dispersed in the nylon.

Example 3

Films 0.010 inch (0.25 mm) thick are hot pressed from Blend 1 and Blend 2, and from g-ETFE and nylon as controls. Portions of these films are then mounted in modified Thwing-Albert permeation cups according to ASTM E96-66. Each test cup is loaded with 100 mL (~76 g) of Fuel CM15 (15% of methanol in Fuel C, which is 50/50 isooctane/toluene), and a 76.2-mm-diameter diaphragm of the test film is placed on top of the cup. The diaphragm is held in place using a six-bolt flange sealing ring with a fluoroelastomer sealing gasket. The exposed surface area of the diaphragm is 37 cm². The cup is weighed after assembly, inverted so that the fuel is in contact with the test diaphragm, and then weighed at various intervals over a 31 day period. Testing is conducted at room temperature, and samples are tested in duplicate. Rates of weight loss are presented in Table 1, which shows the average for each pair of tests, and also as normalized relative to nylon. The rate of weight loss for g-ETFE is not measurable in this test. Even though g-ETFE is only 13.3 vol % of Blend 1, the permeation rate for Blend 1 is 87% lower than that for pure nylon. Likewise, the permeation rate for Blend 2 is 96% lower than that for nylon, even though g-ETFE is only 38 vol % of the blend. These results are surprising in that one would expect the permeation rate relative to pure nylon to be reduced in proportion to the g-ETFE fraction in the melt-mixed blend.

TABLE 1

| | Permeation Testing | |
|---|---|---|
| | Average Rate of Weight Loss | |
| Diaphragm | Loss (g/day) | Normalized (%) |
| Nylon | 0.1700 | 100 |
| Blend 1 | 0.0226 | 13 |
| Blend 2 | 0.0065 | 4 |
| g-ETFE | — | ~0 |

Example 4

Blend 1 and a polyamide resin (Zytel® nylon grade ST811, DuPont) are coextruded as a two-layer composite tubing having Blend 1 as the inner layer and the polyamide as the outer layer. The melt-mixed blend is extruded using a 1.0-in (2.54-cm) Davis extruder equipped with a general purpose extrusion screw and at a melt temperature of 530° F. (277° C.) entering the coextrusion crosshead to form the inner layer of coextruded tubing. The polyamide is extruded using a 1.5-in (3.81-cm) Davis extruder equipped with a general purpose screw and at a melt temperature of 451° F. (233° C.) entering the coextrusion crosshead to form the outer layer of the coextruded tubing. The crosshead die temperature is 550° F. (288° C.) and the extrusion rate is 8.5 ft/min (259 cm/min). The coextruded tubing is 0.270 inch (6.86 mm) in outer diameter and has a wall thickness of 0.030 inch (0.76 mm) of which the fluoropolymer inner layer is 0.003 inch (0.08 mm) thick. Adhesion between the inner and outer layers of the coextruded tubing is demonstrated by cutting lengths of the tubing longitudinally in half and flexing and bending a resultant half of the tubing. The layers do not separate, demonstrating the adhesion of the melt-mixed blend to polyamide. Such composite tubing can be used for fuel transport tubing.

Example 5

Blend 3 is 20 wt % (16.0 vol %) g-ETFE dispersed in a PET matrix. Blend 3 is prepared essentially by the procedure of Example 1, except that PET is fed at 160 lb/hr instead of nylon and external barrel temperatures are 260°–285° C. TEM for a film sample shows good mixing, with predominantly spherical g-ETFE particles having average diameter of less than 500 nm well dispersed in the PET.

Example 6

Blend 4 is 50 wt % (43.3 vol %) g-ETFE dispersed in a PET matrix. Blend 4 is prepared essentially by the procedure of Example 5, except that the feed rates of the g-ETFE and the PET are each 100 lb/hr (45.5 kg/hr). TEM for a film sample again shows good mixing, with predominantly spherical g-ETFE particles having average diameter of less than 500 nm well dispersed in the PET.

Example 7

The procedure of Example 5 is essentially repeated, except that the PET is replaced with TPE at the same feed rate to obtain Blend 5 that is 15.8 vol % g-ETFE. TEM for a film sample shows good mixing, with predominantly spherical g-ETFE particles having average diameter of less than 500 nm well dispersed in the thermoplastic polyester elastomer.

Example 8

The procedure of Example 4 is essentially repeated, except that Blend 5 (TPE matrix, prepared as in Example 13) is used instead of Blend 1 and TPE is used instead of polyamide, the melt-mixed blend is extruded using a 1.0-inch (2.54-cm) Entwistle extruder equipped with a mixing screw, the melt temperature of Blend 3 entering the crosshead is 444° F. (229° C.), the Davis-Standard extruder is equipped with a mixing screw, the polyester melt temperature entering the crosshead is 418° F. (214° C.), the crosshead die temperature is 600° F. (316° C.), and the extrusion rate is 10 ft/min (305 cm/min). The coextruded tubing is 0.270 inch (6.86 mm) in outer diameter and has a wall thickness of 0.030 inch (0.76 mm) of which the melt-mixed blend inner layer is 0.003 inch (0.08 mm) thick. Adhesion between the inner and outer layers of the coextruded tubing is demonstrated by cutting lengths of the tubing longitudinally in half and flexing and bending a resultant half of the tubing. The layers do not separate, demonstrating the adhesion of the melt-mixed blend to polyester. Such composite tubing can be used for fuel transport tubing.

Example 9

The MFR of Blend 1 is 91 g/10 min as measured according to ASTM D-3159 as for ETFE resins. See above. This indicates that the blend is useful for the injection molding of complex shapes and parts having thin sections. Blend 1 is used to injection mold a canister in a 200-ton (181 tonne) injection molding machine (HPM) equipped for a 3-oz (89-mL) shot. The part is of good quality, demonstrating the fabrication of articles of the invention by injection molding.

Example 10

Blend 3 (Example 5) is also prepared by melt mixing with one pass through a 25-mm Brabender parallel twin screw extruder operating at 180 rpm and at an external barrel temperature of 330° C. TEM for a film sample shows good mixing, with predominantly spherical g-ETFE particles having average diameter of about 275 nm well dispersed in the PET. Tensile strength is 7516 psi (51.8 MPa) and elongation is 282%.

Example 11

Blend 4 (Example 6) is also prepared with one pass through the Brabender twin screw extruder. Tensile strength is 6613 psi (45.6 MPa) and elongation is 78%.

Example 12

Blend 6 is similar to Blend 4 (Example 11) except that half of the g-ETFE is replaced with a similar ETFE resin that has not been grafted. TEM for a film sample shows good mixing, with predominantly spherical g-ETFE particles having average diameter of about 450 nm well dispersed in the PET. Tensile strength is 5697 psi (39.3 MPa) and elongation is 173%.

Example 13

Blend 5 (Example 7) is also prepared by melt-mixing the g-ETFE and the TPE with two passes through the Brabender twin screw extruder operating at 180 rpm and at an external barrel temperature of 330° C. TEM for a film sample shows good mixing, with predominantly spherical g-ETFE particles having average diameter of about 450 nm well dispersed in the TPE. Tensile strength is 4557 psi (31.4 MPa) and elongation is 45%. When the experiment is repeated using a similar ETFE resin that has not been grafted, dispersed ETFE spherical particles are much larger, of the order of 3000 nm in average diameter, tensile strength is 2736 psi (18.9 MPa), and elongation is only 8%. For the latter blend, TEM indicates that there is no interaction between the ETFE particles and the TPE matrix, with the ETFE particles separating from and in some instances falling out of the matrix. This is in contrast to Blend 5, for which TEM shows no separation of g-ETFE from the matrix, and is consistent with the strength and elongation differences.

Example 14

Blend 1 is used to injection mold a cup-like canister in an 8-oz (237-mL) Cincinnati Milacron injection molding maching. Melt temperature is 569° F. (298° C.), overall cycle time is 28 sec, and part weight is 21.5 g. The part is of good quality, demonstrating the fabrication of articles of the invention by injection molding.

Example 15

Sheets approximately 6 inch (15 cm) square and 0.030 inch (0.76 mm) thick are molded from Blend 1, and from an ETFE resin that is not functionalized by polar grafting (Tefzel® ETFE fluoropolymer resin grade 200, DuPont), by hot pressing. The sheets are placed together within the 6-inch square opening in a 0.050-inch (1.3-mm) thick chase and between two metal plates. This sandwich is placed in a laboratory press having heated platens at 300° C., and the sandwich is heated for 5 min without applied pressure. The pressure on the sandwich is increased to 56 psi (0.39 Mpa) for 5 min. Then, the pressure is released, the platens are allowed to cool, and the sample is examined. The two sheets are in intimate contact and cannot be separated with fingernails or even with a knife. By visual examination of the interface, it appears that Blend 1 and the fluoropolymer have merged (blended) at the interface. When a sheet of nylon is substituted for the Blend 1 sheet and the laminating procedure is repeated, there is no interaction between the nylon and the ETFE, i.e., no adhesive bond is formed. The adhesive bond between Blend 1 and the ETFE indicates the adhesive activation of the nylon by the g-ETFE.

This bonding is also accomplished by coextrusion using the following process. Blend 1 and ETFE 200 are coextruded as a two layer composite having the fluoropolymer as the inner layer and Blend 1 as the outer layer. The ETFE resin is extruded using a 1.0 inch (2.54 cm) Davis extruder equipped with a mixing screw and at a melt temperature of 575° F. (302° C.). The melt-mixed blend is extruded using a 1.5-inch (38-mm) Davis extruder equipped with a general purpose screw at a melt temperature of 530° F. (277° C.).

The die has a land length of 3.5 inch (8.9 cm) and the extrusion is carried out in a pressure extrusion mode at the rate of 10 ft/min (3.05 m/min). The crosshead die temperature is 550° F. (288° C.). The coextruded tubing is 0.270 inch (6.9 mm) in outside diameter and has a wall thickness of 0.030 inch (0.76 mm) of which the ETFE resin inner layer is 0.005 inch (0.13 mm) thick. Adhesion between the layers is tested by cutting lengths of the tubing longitudinally in half, and flexing and bending a resultant half of the tubing. The layers do not separate, demonstrating the adhesion of the melt-mixed blend of the invention to the fluoropolymer. Such composite tubing can be used for fuel transport tubing.

Polyamide can also be coextruded along with the above components in a multi-layer system having the melt-mixed blend as the middle layer, using the polyamide extrusion conditions described in Example 4.

Example 16

The hot pressure procedure of Example 15 is essentially repeated, except that Blend 3 prepared as in Example 11 is used instead of Blend 1. The two sheets are in intimate contact and cannot be separated with fingernails or even with a knife. By visual examination of the interface, it appears that Blend 3 and the fluoropolymer have merged (blended) at the interface. When a sheet of PET is substituted for the Blend 3 sheet and the laminating procedure is repeated, there is no interaction between the polyester and the ETFE, i.e., no adhesive bond is formed.

Example 17

The hot-pressing procedure of Example 15 is essentially repeated, except that Blend 5 prepared as in Example 13 is used instead of Blend 1. The two sheets are in intimate contact and cannot be separated with fingernails or even with a knife. By visual examination of the interface, it appears that Blend 5 and the fluoropolymer have merged (blended) at the interface. When a sheet of TPE is substituted for the Blend 5 sheet and the laminating procedure is repeated, there is no interaction between the polyester and the ETFE, i.e., no adhesive bond is formed.

This bonding is also accomplished by essentially repeating the coextrusion procedure of Example 15, except that Blend 5 is used instead of Blend 1, the melt-mixed blend melt temperature is 500° F. (260° C.), and the crosshead die temperature is 530° F. (288° C.). Adhesion between the layers is tested by cutting lengths of the tubing longitudinally in half, and flexing and bending a resultant half of the tubing. The layers do not separate, demonstrating the adhesion of the melt-mixed blend of the invention to the fluoropolymer. Such composite tubing can be used for fuel transport tubing.

TPE can also be coextruded along with the above components in a multi-layer system having the melt-mixed blend as the middle layer, using the TPE extrusion conditions described in Example 8.

What is claimed is:

1. Vessels and transport lines comprising a blend of polar-grafted fluoropolymer dispersed in polar polymer which is incompatible with said fluoropolymer prior to polar grafting of said fluoropolymer, said polar polymer providing strength to said vessels and transport lines and said polar-grafted fluoropolymer dispersed therein providing improved impermeability of said vessels and transport lines to hydrocarbon fluids, the polarity of said polar-grafted fluoropolymer being obtained by grafting an ethylenically unsaturated compound having polar functionality to the fluoropolymer of said polar-grafted fluoropolymer, wherein the polar-grafted fluoropolymer comprises 3 to 43 vol % of said blend, based on the combined volume of polar polymer and polar grafted fluoropolymer.

2. The vessels and transport lines of claim 1 wherein said vessels and transport lines comprises a layer of said blend adhered to (a) a layer of said polar polymer, (b) a layer of said polar-grafted fluoropolymer, (c) a layer of said fluoropolymer without polar grafting, or (d) said (a) and said (c) with said layer of said blend adhering layers (a) and (c) together.

3. The vessels and transport lines of claim 2 wherein said vessels and transport lines is made by coextrusion.

4. The vessels and transport lines of claim 1 wherein said transport lines are in the form of fuel line hose.

5. The vessels and transport lines of claim 1 wherein said transport lines are in the form of fuel filler hose.

6. The vessels and transport lines of claim 1 wherein said transport lines are in the form of vapor return hose.

7. The vessels and transport lines of claim 1 wherein said vessels are in the form of a canister, said canister consisting essentially of said blend.

8. The vessels and transport lines of claim 1 wherein said hydrocarbon fluid is fuel, antifreeze, and/or alcohol.

9. The vessels and transport lines of claim 1 wherein said vessels and transport lines consist essentially of a layer of said blend adhered to a layer of said polar polymer.

10. The vessels and transport lines of claim 1 wherein said vessels and transport lines consist essentially of a layer of said blend adhered to a layer of said fluoropolymer without polar grafting.

11. The vessels and transport lines of claim 1 wherein said polar polymer is polyester.

12. The vessels and transport lines of claim 1 wherein said polar polymer is polyurethane.

13. The vessels and transport lines of claim 1 wherein said polar-grafted fluoropolymer comprises 10 to 21 vol % of said blend based on the combined volume of said polar polymer and polar-grafted fluoropolymer.

* * * * *